Oct. 20, 1959

R. P. GRAEF 2,909,620

MU-BETA MEASUREMENT IN FEEDBACK SYSTEMS

Filed Jan. 5, 1954

INVENTOR
R. P. GRAEF
BY N. S. Ewing
ATTORNEY

United States Patent Office 2,909,620
Patented Oct. 20, 1959

2,909,620

MU-BETA MEASUREMENT IN FEEDBACK SYSTEMS

Robert P. Graef, Morristown, N.J., assignor to Bell Telephone Laboratories, Incorporated, New York, N.Y., a corporation of New York Application January 5, 1954, Serial No. 402,335

7 Claims. (Cl. 179—171)

This invention relates generally to the measurement of the $\mu\beta$ product in feedback systems and more particularly, although not exclusively, to the measurement of the $\mu\beta$ product in D.-C. feedback amplifiers and position servo systems.

The development of feedback amplifier and servo systems generally requires knowledge of the gain around the feedback loop and the associated phase shift. In the past, these quantities have generally been measured directly by opening the feedback loop at a convenient point and measuring the complex ratio of the output at the break to the input injected at the break. This method, which is suitable for A.-C. amplifiers, is difficult to apply to any feedback system which has high gain at D.-C. because normally insignificant unbalances tend to make the system drift into a state of overload or non-linearity when the loop is opened.

Various indirect methods have also been used in attempts to extract the desired data, some of the most common of which involve observation of the transient response to a step input. Such methods are, however, subject to the limitations imposed by non-linearity in the amplifying unit and by disturbing the feedback loop when the measuring equipment is connected. Such limitations are particularly stringent in a position servo loop, where the mechanical elements contribute non-linearity of such magnitude that linear servo concepts are valid only over restricted excursions.

The object of the present invention is to provide a closed loop method for measuring the $\mu\beta$ product in feedback amplifiers and servo systems where previously known methods are not applicable because of non-linearity or instability.

In a principal aspect, the invention is a method of measuring the $\mu\beta$ product of a feedback amplifier or servo system with the feedback loop closed which comprises applying a forcing voltage to a summing point in the feedback loop, measuring the voltage fed back to that point around the feedback loop, and measuring the sum of the forcing voltage and the voltage fed back to the summing point. An amplifier with frequency characteristics appropriate to the system in use or being measured is used to take the measurements. In some systems, a D.-C. summing amplifier such as that shown in United States Patent 2,401,779, issued June 11, 1946, to K. D. Swartzel, may find ready applications. The $\mu\beta$ product of the amplifier or servo system is taken as the complex ratio of the voltages measured. If no suitable summing point exists in the feedback loop, one is provided by inserting a unity gain summing amplifier for that purpose.

In another aspect, the invention takes the form of suitable apparatus connected to a feedback system for the above-described measurements. Thus, one physical embodiment of the invention can be described as means to apply a forcing voltage to the feedback loop of an electrical feedback system at one point thereof, means to measure the amplitude and phase of the voltage fed back to that point around the feedback loop with the feedback loop closed, and means to measure the amplitude and phase of the sum of the forcing voltage and the voltage fed back around the feedback loop.

A more thorough understanding of the nature of the invention and its applicability to feedback amplifier and servo systems may be obtained from a study of the following detailed analysis. In the drawings.

Figure 1:
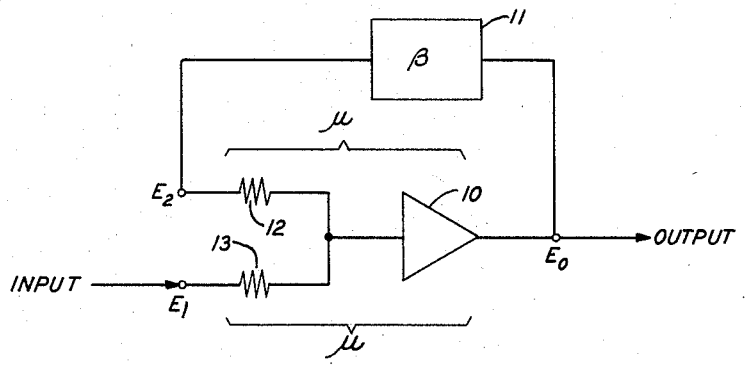
Figure 1 illustrates a generalized single-loop feedback system having a convenient summing point.

The generalized system illustrated in Fig. 1 may be taken to represent substantially any single-loop feedback arrangement such as a feedback amplifier or a servo control system. Individual components or groups of components within the feedback loop may, of course, have one or more individual feedback loops within the main feedback loop, but the overall system is essentially of a single-loop nature.

In Fig. 1, there is shown a $\mu$ circuit composed of an amplifying unit 10, the input side of which represents a low impedance summing point. A $\beta$ circuit 11 is returned from the output side to the input side of amplifier 10 through a first summing resistor 12. A signal input or forcing voltage is applied to the input side of amplifier 10 through a second summing resistor 13, while output is taken directly from the output side of amplifier 10.

The present invention permits the direct measurement of the complex loop gain around the system shown in Fig. 1 without necessitating any opening of the feedback loop. A forcing voltage $E_1$ is applied to summing resistor 13. This signal passes through amplifier 10, and an amplified replica thereof appears at the output side of amplifier 10 as the output voltage $E_0$. The voltage $E_2$ appearing at the other summing resistor 12 is that part of the output voltage $E_0$ which is applied through the feedback or $\beta$ circuit 11 to the input of amplifier 10. The $\mu\beta$ product of the system is found directly by measuring voltage $E_2$ and the sum of voltages $E_1$ and $E_2$ and taking the ratio of their magnitudes and the differences of their phases.

In the following analysis, $\beta$ represents the complex gain of the feedback circuit 11, while $\mu$ represents that of the amplifier unit 10 plus either resistor 12 or resistor 13. In general, the impedances of these resistors are equal, making $\mu$ the gain of the amplifier 10 plus either resistor.

The usual expression for the gain of a feedback amplifier is $$\frac{E_0}{E_1}=\frac{\mu}{1-\mu\beta} \qquad (1)$$

This may be rewritten to provide an explicit solution for $\mu\beta$ by making the substitution $$E_2=\beta E_0 \qquad (2)$$

where, as explained above, $E_2$ is that part of the output voltage which is applied to the input. Thus, $$\mu\beta = \frac{E_2}{E_1+E_2} \quad (3)$$

Figure 2:
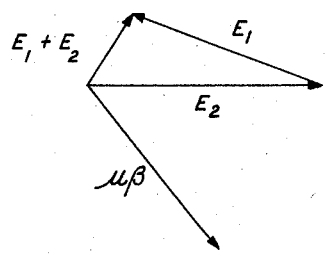
Fig. 2 is a vector diagram showing the relation between the $\mu\beta$ product of the feedback system illustrated in Fig. 1 and the voltages measured in accordance with the teachings of the present invention.

In Equation 3, all terms are, of course, vector quantities, making the magnitude of $\mu\beta$ equal to the ratio of the magnitudes of $E_2$ and $(E_1+E_2)$ and the phase of $\mu\beta$ equal to the difference between the phases of $E_2$ and $(E_1+E_2)$. A vector diagram showing an example of the relationships between these quantities appears as Fig. 2.

While the generalized feedback system illustrated in Fig. 1 has a convenient low impedance summing point at which the voltages $E_1$ and $(E_1+E_2)$ can be measured, it is not essential to the practice of the invention that there be such a point. If there is not such a point which may, for example, be found at the input of a D.-C. summing amplifier, a unity gain D.-C. summing amplifier may be inserted in the feedback loop for that purpose. Thus, in Fig. 1, the input side of amplifier 10 may be regarded as a convenient low impedance summing point or the combination of amplifier 10 and summing resistors 12 and 13 may be regarded as a unity gain D.-C. summing amplifier inserted in the feedback loop for the purpose of facilitating measurements. In the latter case, the input and output terminals are not necessarily the input and output terminals of the system being tested but are rather only temporary terminals provided for testing purposes. The regular gain-producing elements of the circuit can, under such circumstances, be considered as being included with the feedback circuit itself in the unit 11. Such an auxiliary unity gain summing amplifier does not disturb the operation of the circuit in any way and may be inserted in series in the $\mu\beta$ loop at any convenient point thereof.

Figure 3:
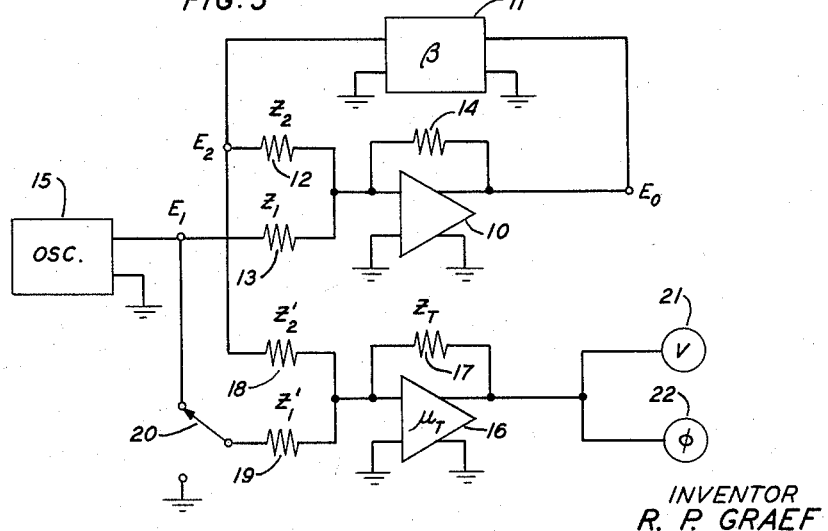
Fig. 3 shows an arrangement for measuring the $\mu\beta$ product of a generalized feedback amplifier or servo system in accordance with the invention.

Fig. 3 illustrates in block diagram form a specific arrangement for measuring the $\mu\beta$ product of a feedback system in accordance with the present invention. The generalized feedback system may, for example, be either a feedback amplifier or a servo control system and is, in general, the same as that illustrated in Fig. 1. As in Fig. 1, the low impedance summing point may either be a basic component of the feedback system itself or be provided by an auxiliary unity gain D.-C. summing amplifier. In Fig. 3, a local feedback resistor 14 is provided between the high potential input and output terminals of amplifier 10 to indicate its D.-C. summing nature.

In accordance with the principles of the invention, an oscillator 15 constituting a source of forcing voltage is connected between the input end of summing resistor 13 and ground and an auxiliary measuring circuit is connected to summing resistors 12 and 13. The latter circuit takes the form of a second D.-C. summing amplifier which comprises an amplifying unit 16, a feedback resistor 17 interconnecting the high potential input and output terminals of amplifying circuit 16, and a pair of summing resistors 18 and 19 connected to the high potential input terminal of amplifying circuit 16. Summing resisor 18 is connected directly to summing resistor 12 in the feedback system to be measured, while summing resistor 19 is connected to a two-position switch 20. In one position, switch 20 couples resistor 19 directly to summing resistor 13 in the feedback system under test and in the other it connects resistor 19 to ground. The output of the measuring summing amplifier is connected to a voltmeter 21 and a phase meter 22. A suitable phase meter is discussed, for example, in pages 230 through 233 of the article "A Precise Direct Reading Phase and Transmission Measuring System for Video Frequencies," by D. A. Alsberg and D. Leed, appearing at page 221 of the April 1949 issue of the Bell System Technical Journal.

When measuring $\mu\beta$ with the novel circuit arrangement illustrated in Fig. 3 of the drawings, the voltage $(E_1+E_2)$ is measured with switch 20 connecting summing resistors 13 and 19 together, while the voltage $E_2$ is measured with switch 20 connecting resistor 19 to ground.

The accuracy of this method of measurement is independent of the characteristics of the auxiliary measuring amplifier and depends only upon the matching of the summing resistors in its input circuit and those in the $\mu$ circuit of the feedback loop. This accuracy can be shown by the following simple analysis of the measuring circuit illustrated in Fig. 3, in which $Z_1$ represents the impedance of resistor 13, $Z_2$ represents the impedance of resistor 12, $Z_1'$ represents the impedance of resistor 19, $Z_2'$ represents the impedance of resistor 18, $Z_T$ is the impedance of the measuring amplifier feedback resistor, $V_1$ is the component of the output voltage of the measuring amplifier produced by the signal across summing resistor 19 when the latter element is connected to the system under test, and $V_2$ is the component of the output voltage of the measuring amplifier produced by the signal across summing resistor 18. $Z_1$ and $Z_2$ are assumed to be equal.

$$V_1 = E_1 \frac{Z_T}{Z_1'} \cdot \frac{1}{1-\frac{1}{\mu}\left(1+\frac{Z_T}{Z_1'}+\frac{Z_T}{Z_2'}\right)} \quad (4)$$

$$V_2 = E_2 \frac{Z_T}{Z_2'} \cdot \frac{1}{1-\frac{1}{\mu}\left(1+\frac{Z_T}{Z_1'}+\frac{Z_T}{Z_2'}\right)} \quad (5)$$

$$V_1+V_2 = \left(E_1\frac{Z_T}{Z_1'}+E_2\frac{Z_T}{Z_2'}\right)\frac{1}{1-\frac{1}{\mu}\left(1+\frac{Z_T}{Z_1'}+\frac{Z_T}{Z_2'}\right)} \quad (6)$$

$$\frac{V_2}{V_1+V_2} = \frac{E_2\frac{Z_T}{Z_2'}}{E_1\frac{Z_T}{Z_1'}+E_2\frac{Z_T}{Z_2'}} = \frac{\frac{E_2}{Z_2'}}{\frac{E_1}{Z_1'}+\frac{E_2}{Z_2'}} \quad (7)$$

In Equation 3, it is shown that the complex product for the feedback system under test is equal to the complex ratio of $E_1$ to $(E_1+E_2)$. As stated previously, therefore, the accuracy of the measurement is completely independent of the characteristics of the measuring amplifier and depends only on the matching of the summing resistors in its input circuit and those in the $\mu$ circuit of the feedback loop. $Z_1$ and $Z_2$ were assumed to be equal at the beginning of the above analysis, and it is evident that if $Z_1'$ and $Z_2'$ are equal, the complex ratio of $V_2$ to $(V_1+V_2)$ will be a precise measurement of the $\mu\beta$ product of the device under test.

Figure 4:
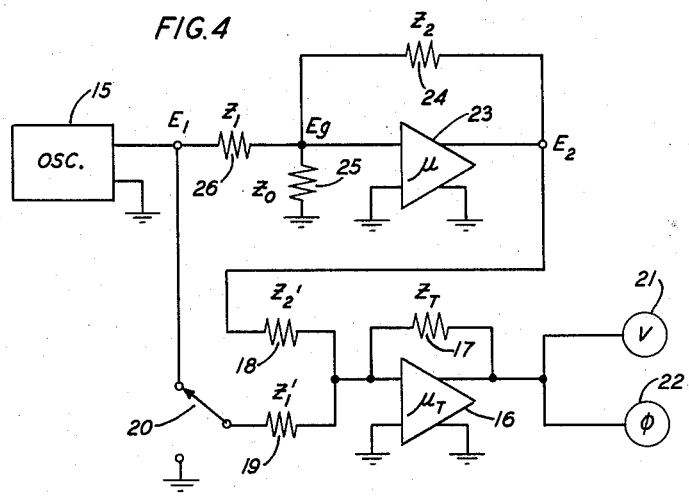
Fig. 4 illustrates an arrangement for measuring the $\mu\beta$ product of a D.-C. feedback amplifier in accordance with the principles of the present invention.

The method featured by the invention may also be adapted to measure the $\mu\beta$ product of a D.-C. feedback amplifier such as that shown in Fig. 4, which may be recognized as a closed loop preceded by an attenuator. This D.-C. amplifier is composed of an amplifying or $\mu$ circuit 23, a feedback resistor 24 interconnecting the high potential terminals at the input and output sides of amplifying unit 23, a resistor 25 connected across the input terminals of amplifying unit 23, and an input resistor 26 connected to the junction between resistors 24 and 25.

The D.-C. feedback amplifier illustrated in Fig. 4 corresponds, it will be noted, to the generalized feedback system shown in Figs. 1 and 3 in that there is a low impedance summing point to which, in accordance with the principles of the invention, $\mu\beta$ measurements can be taken. That point is the high potential terminal at the input side of amplifying unit 23. Resistors 24 and 26 in Fig. 4 correspond to summing resistors 12 and 13 in Figs. 1 and 3 but in general are not of the same magnitude. The necessary measurement can, however, still be made.

The measuring amplifier in the arrangement shown in Fig. 4 is the same as that shown in Fig. 3. However, while basically the same as in Fig. 3, the connections to the system under test are somewhat different. In Fig. 4, resistor 24 is the entire $\beta$ circuit with the result that voltages $E_0$ and $E_2$ are identical. Therefore, summing resistor 18 of the measuring amplifier is connected directly to the high potential output terminal of amplifying or $\mu$ circuit 23. Feedback resistor 24 of the D.-C. amplifier under test thus performs the function of summing resistor 12 in Fig. 3. Resistor 26 corresponds to summing resistor 13 in Fig. 3 and one side of switch 20 is connected to a point between it and the forcing voltage source 15.

Since the resistors 24 and 26 are not equal in the D.-C. amplifier connected for measurement of its $\mu\beta$ product in Fig. 4, the complex value of that quantity is not necessarily given by the ratio of $E_2$ to the sum of $E_1$ and $E_2$. However a somewhat similar relationship exists which can be shown by a fairly simple calculation.

In the following analysis, $Z_0$ represents the impedance of resistor 25, $Z_1$ represents the impedance of resistor 26, $Z_2$ represents the impedance of resistor 24, and $E_g$ is the voltage applied to the input of the amplifying or $\mu$ circuit 23. All of the other quantities are the same as those used in the analysis of Fig. 3.

In the D.-C. amplifier under test in Fig. 4, the feedback factor $\beta$ is given by the equation $$\beta = \frac{\frac{Z_0 Z_1}{Z_0 + Z_1}}{Z_2 + \frac{Z_0 Z_1}{Z_0 + Z_1}} = \frac{Z_0 Z_1}{Z_0 Z_1 + Z_1 Z_2 + Z_2 Z_0} \quad (8)$$

and the input to the forward or $\mu$ circuit 23 with $\mu=0$ is $$E_g(\mu=0) = E_1 \frac{\frac{Z_0 Z_2}{Z_0 + Z_2}}{Z_1 + \frac{Z_0 Z_2}{Z_0 + Z_2}} = E_1 \frac{Z_0 Z_2}{Z_0 Z_1 + Z_1 Z_2 + Z_2 Z_0} \quad (9)$$

By the principle of superposition, the total voltage applied to the input of the $\mu$ circuit is $$E_g = \beta E_2 + E_g(\mu=0) \quad (10)$$

Since $$E_2 = \mu E_g \quad (11)$$

a solution for $E_2$ can be obtained by multiplying both sides of Equation 10 by $\mu$ and substituting therein the value for $E_g(\mu=0)$ given in Equation 9.

Thus, $$E_2 = \mu\beta E_2 + \mu E_1 \frac{Z_0 Z_2}{Z_0 Z_1 + Z_1 Z_2 + Z_2 Z_0} \quad (12)$$

and, rearranging terms, $$E_2 = E_1 \left(\frac{\mu}{1-\mu\beta}\right) \frac{Z_0 Z_2}{Z_0 Z_1 + Z_1 Z_2 + Z_2 Z_0} \quad (13)$$

Solving for the insertion gain, $$G = \frac{E_2}{E_1} = \frac{Z_0 Z_2}{Z_0 Z_1 + Z_1 Z_2 + Z_2 Z_0} \left(\frac{\mu}{1-\mu\beta}\right) \quad (14)$$

Substituting in Equation 14 for $\beta$ from Equation 8 yields the following familiar expression for a D.-C. amplifier:

$$G = \frac{E_2}{E_1} = -\frac{Z_2}{Z_1} \frac{1}{1 - \frac{1}{\mu}\left(1 + \frac{Z_2}{Z_0} + \frac{Z_2}{Z_1}\right)} = -\frac{Z_2}{Z_1} \frac{1}{1 - \frac{1}{\mu\beta}} \quad (15)$$

Solving now for $\mu\beta$, $$\mu\beta = \frac{\frac{E_2}{Z_2}}{\frac{E_1}{Z_1} + \frac{E_2}{Z_2}} \quad (16)$$

As stated previously, the present invention permits the $\mu\beta$ product of the D.-C. feedback amplifier shown in Fig. 4 to be measured just as easily as that of the generalized feedback system shown in Fig. 3. Reference to Equation 7 shows that if $Z_1'$ is made equal to $Z_1$ and $Z_2'$ is made equal to $Z_2$, the complex ratio of voltages observed by the measuring equipment for the two positions of switch 20 in Fig. 4 is equal to $\mu\beta$ and, as before, the characteristics of the measuring amplifier do not enter into the measurement.

When, in accordance with the present invention, an auxiliary measuring amplifier is used to provide voltage magnitude and phase readings in the manner shown in Figs. 3 and 4, the only errors which can influence the results adversely are those which result from unmatched summing resistors. To assess such errors in the $\mu\beta$ measuring arrangement illustrated in Fig. 3, it is assumed, by way of example, that $$Z_1' = Z_2' \quad (17)$$

and $$Z_2 = Z_1(1+a) \quad (18)$$

where $a$ is the difference in impedance between the mismatched summing resistors 12 and 13. Under such conditions, the gain is different across resistor 13 and $\mu$ circuit 10 than it is across resistor 12 and $\mu$ circuit 10. The first of these can be termed $\mu_1$ and the second $\mu_2$. In other words, $$\mu_1 = \frac{E_0}{E_1} \quad (19)$$

and $$\mu_2 = \frac{E_0}{E_2} \quad (20)$$

but $\mu_1$ and $\mu_2$ are unequal because of the difference in the impedances of resistors 12 and 13.

The relation between $\mu_1$ and $\mu_2$ is given by the equation $$\mu_1 = \mu_2(1+a) \quad (21)$$

and the true loop gain is $$\mu_2\beta = \frac{E_2}{E_1(1+a) + E_2} \quad (22)$$

Solving for the percentage error in $\mu_2\beta$ where $$\frac{E_2}{E_1 + E_2} = \mu\beta \quad (3)$$

as before is the observed value of loop gain, $$\text{Error} = \frac{\mu\beta - \mu_2\beta}{\mu_2\beta} \times 100$$

$$= \frac{\frac{E_2}{E_1 + E_2} - \frac{E_2}{E_1(1+a) + E_2}}{\frac{E_2}{E_1(1+a) + E_2}} \times 100 = a(1-\mu\beta) \times 100 \quad (23)$$

It is evident that the summing resistor matching required for acceptable accuracy is dependent on the value of $\mu\beta$ and that for values in the vicinity of gain crossover ($\mu\beta = -1$), quite wide tolerances are permissible. The same analysis applies to resistor matching in the measuring amplifier input network.

A more general expression for the error may be set down in vector form:

$$\frac{|\mu\beta|}{|\mu_2\beta|}\underline{/\theta-\varphi} = 1 + |a|\underline{/\alpha}(1-|\mu\beta|\underline{/\theta})$$

$$= 1 + a\sqrt{1 - 2\mu\beta\cos\theta + (\mu\beta)^2}\, e^{j\left(a - \tan^{-1}\frac{\mu\beta\sin\theta}{1-\mu\beta\cos\theta}\right)} \quad (24)$$

The second term in the right-hand expression in Equation 24 is the complex form of the error, and Equation 24 may be rewritten as $$\frac{|\mu\beta|}{|\mu_2\beta|}\underline{/\theta-\phi} = 1 + \frac{E}{100}e^{j\gamma} \quad (25)$$

where $E$ is the magnitude of the error and $\gamma$ is its phase angle.

Figure 5:
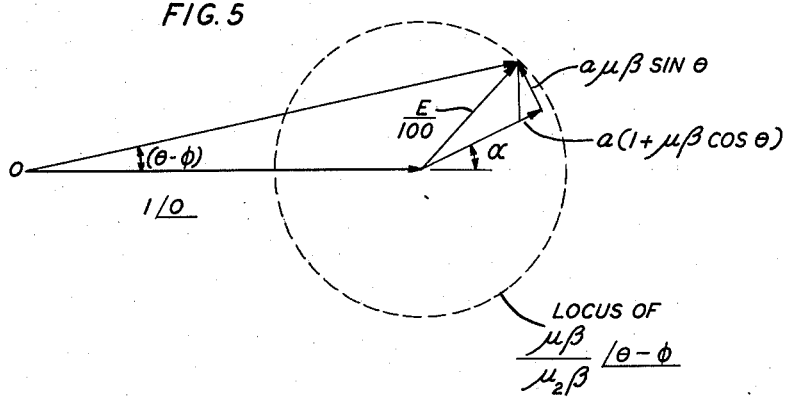
Fig. 5 is a vector diagram showing the insignificance of the possible error involved in the measurement of $\mu\beta$ in accordance with the invention.

Equation 25 shows that the complex ratio between the true and indicated values of loop gain is represented by the locus of the sum of two vectors, $$|1|\underline{/0} \text{ and } \left|\frac{E}{100}\right|\underline{/\gamma}$$

where in general, $\underline{/\gamma}$ may be any angle. This relationship is illustrated in Fig. 5. By differentiating $(\theta-\psi)$ with respect to $\gamma$, the maximum angular error in $\mu\beta$ may be found to be $$(\theta-\varphi)_{max} = \tan^{-1}\frac{\frac{E}{100}}{\sqrt{1-\left(\frac{E}{100}\right)^2}} \quad (26)$$

which, even with a one percent matching error, results in a phase error not exceeding 0.6 degree.

The measuring circuits and techniques embodying the principles of the invention which have been described make possible direct and reliable measurements of the loop gain of a feedback system under closed loop conditions. While of general applicability, they are particularly advantageous in such systems as servo control systems and D.-C. feedback amplifiers to which the measuring circuits and techniques of the prior art are not well suited.

It is to be understood that the specific circuit arrangements which have been described are illustrative of the application of the principles of the invention. Numerous others may be devised by those skilled in the art without departing from the spirit and scope of the invention.

What is claimed is:

1. In combination, a feedback loop including amplifier means, means to measure the loop gain around said feedback loop on a closed loop basis, and circuit means for applying a forcing voltage between a first point in said feedback loop and a point of reference potential, said forcing voltage causing another voltage to be fed back around said loop to a second point separated by impedance means from said first point, said measuring means being adapted to measure the amplitude and phase of said fed back voltage at said second point and also the amplitude and phase of the sum of said forcing voltage and said fed back voltage, said measuring means including a summing amplifier having a pair of inputs, one of said pair of inputs being connected to receive said fed back voltage, and the other of said pair of inputs being connected by a two-position switch to receive said forcing voltage in one position of said switch and being connected to said point of reference potential in the other position of said switch; whereby the magnitude of said loop gain is equal to the ratio of the amplitude of said fed back voltage to the amplitude of the sum of said forcing voltage and said fed back voltage, and the phase of said loop gain is equal to the difference between the phase of said fed back voltage and the phase of the sum of said forcing voltage and said fed back voltage.

2. In combination, a feedback loop, means to measure the loop gain of said feedback loop on a closed loop basis, a unity gain summing amplifier having first and second input means each including a summing impedance, said summing amplifier along with its said first input means being connected in series in said feedback loop, and circuit means to apply a forcing voltage between said second summing amplifier input means and a point of reference potential, said forcing voltage causing another voltage to be fed back around said loop to said first summing amplifier input means, said measuring means being adapted to measure the amplitude and phase of said fed back voltage and also the amplitude and phase of the sum of said forcing voltage and said fed back voltage, said measuring means including a second summing amplifier having a pair of inputs, one of said pair of inputs being connected to receive said fed back voltage, and the other of said pair of inputs being connected by a two position switch to receive said forcing voltage in one position of said switch and being connected to said point of reference potential in the other position of said switch, whereby the magnitude of said loop gain is equal to the ratio of the amplitude of said fed back voltage to the amplitude of the sum of said forcing voltage and said fed back voltage and the phase of said loop gain is equal to the difference between the phase of said fed back voltage and the phase of the sum of said forcing voltage and said fed back voltage.

3. In combination, a feedback loop including amplifier means and a low-impedance summing point, means to measure the loop gain around said feedback loop on a closed loop basis, and circuit means to apply a forcing voltage between said low impedance summing point and a point of reference potential, said forcing voltage causing another voltage to be fed back around said loop to a measuring point separated by impedance means from said low impedance summing point, said measuring means being adapted to measure the amplitude and phase of said fed back voltage and also the amplitude and phase of the sum of said forcing voltage and said fed back voltage, said measuring means including a voltmeter, a phase meter, a two-position switch, and a summing amplifier having an output and a pair of inputs, said output being connected to both said voltmeter and said phase meter, one of said pair of inputs being connected to receive said fed back voltage, and the other of said pair of inputs being connected by said switch to receive said forcing voltage in one position of said switch and being connected to said point of reference potential in the other position of said switch, whereby the magnitude of said loop gain is equal to the ratio of said amplitudes and phase of said loop gain is equal to the difference between said phases.

4. In combination, a feedback loop, means to measure the loop gain around said feedback loop on a closed loop basis, a unity gain summing amplifier having first and second input means each including a summing impedance, said summing amplifier along with its said first input means being connected in series in said feedback loop, and circuit means to apply a forcing voltage between said second summing amplifier input means and a point of reference potential, said forcing voltage causing another voltage to be fed back around said loop to said first summing amplifier input means, said measuring means being adapted to measure the amplitude and phase of said fed back voltage and also the amplitude and phase of the sum of said forcing voltage and said fed back voltage, said measuring means including a voltmeter, a phase meter, a two-position switch, and a summing amplifier having an output and a pair of inputs, said output being connected to both said voltmeter and said voltmeter and said phase meter, one of said pair of inputs being connected to receive said fed back voltage, and the other of said pair of inputs being connected by said switch to receive said forcing voltage in one position of said switch and being connected to said point of reference potential in the other position of said switch, whereby the magnitude of said loop gain is equal to the ratio of said amplitudes and phase of said loop gain is equal to the difference between said phases.

5. In combination, a feedback loop, means to measure the loop gain around said feedback loop on a closed loop basis, an amplifier circuit having an output terminal and first and second input means, said circuit along with its said first input means being connected in series in said feedback loop, and means to apply a forcing voltage between said second amplifier circuit input means and a point of reference potential, said forcing voltage causing another voltage to be fed back around said loop to said first amplifier circuit input means, said first and second amplifier circuit input means each including an individual one of a first pair of matched summing resistors, said measuring means having an input circuit comprising a second pair of matched summing resistors and a pair of input leads each including an individual one of said second pair of matched resistors, said input leads being connected to said amplifier input means to receive for measurement the amplitude and phase of said fed back voltage and also the amplitude and phase of the sum of said fed back voltage and said forcing voltage, said loop gain being equal to the complex ratio of said fed back voltage to said sum of said fed back voltage and said forcing voltage.

6. The combination in accordance with claim 5 wherein said measuring means comprises a summing amplifier having as input leads said pair of input leads of said input circuit; one of said pair of input leads being connected to said first amplifier circuit input means to receive said fed back voltage, and the other of said pair of input leads being connected to said second amplifier circuit input means by a two-position switch to receive said forcing voltage in one position of said switch and being connected to said point of reference potential in the other position of said switch.

7. The combination in accordance with claim 5 wherein said measuring means comprises a voltmeter, a phase meter, a two-position switch, and a summing amplifier having an output connection and having as input connections said pair of input leads of said input circuit; said output connection being connected to said voltmeter and said phase meter; one of said pair of input connections being connected to said first amplifier circuit input means to receive said fed back voltage, and the other of said pair of input connections being connected to said second amplifier circuit input means to receive said forcing voltage in one position of said switch and being connected to said point of reference potential in the other position of said switch.

References Cited in the file of this patent
UNITED STATES PATENTS

| | | |
|---|---|---|
| 2,102,670 | Black | Dec. 21, 1937 |
| 2,173,426 | Scott | Sept. 19, 1939 |
| 2,195,439 | Wilson | Apr. 2, 1940 |
| 2,478,174 | Bair | Aug. 9, 1949 |
| 2,546,156 | Harris | Mar. 27, 1951 |